United States Patent
Yamashita et al.

(10) Patent No.: US 10,515,541 B2
(45) Date of Patent: Dec. 24, 2019

(54) CONTROL DEVICE, SENSOR NODE, AND COMPUTER-READABLE RECORDING MEDIUM

(71) Applicant: FUJITSU LIMITED, Kawasaki-shi, Kanagawa (JP)

(72) Inventors: Koichiro Yamashita, Hachioji (JP); Takahisa Suzuki, Yokohama (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 15/700,611

(22) Filed: Sep. 11, 2017

(65) Prior Publication Data

US 2017/0372601 A1 Dec. 28, 2017

Related U.S. Application Data

(63) Continuation of application No. PCT/JP2015/057562, filed on Mar. 13, 2015.

(51) Int. Cl.
*H04W 84/18* (2009.01)
*G08C 25/00* (2006.01)

(52) U.S. Cl.
CPC ............ *G08C 25/00* (2013.01); *H04W 84/18* (2013.01)

(58) Field of Classification Search
CPC ...... G08C 25/00; H04W 84/18; H04W 52/46; H04W 36/0016; H04W 36/06; H04W 4/38; H04W 4/70
See application file for complete search history.

(56) References Cited

U.S. PATENT DOCUMENTS

| | | | |
|---|---|---|---|
| 2007/0211681 A1* | 9/2007 | Sun | H04L 45/04 370/338 |
| 2008/0221836 A1* | 9/2008 | Tateson | G01D 9/005 702/188 |

(Continued)

FOREIGN PATENT DOCUMENTS

| | | |
|---|---|---|
| JP | 5-69587 | 3/1993 |
| JP | 2003-271231 | 9/2003 |

(Continued)

OTHER PUBLICATIONS

International Search Report dated Jun. 2, 2015 corresponding to International Patent Application No. PCT/JP2015/057562.

(Continued)

*Primary Examiner* — Awet Haile
(74) *Attorney, Agent, or Firm* — Staas & Halsey LLP

(57) ABSTRACT

A control device includes: a processor configured to: control calibration of sensing values in a sensor node group formed of sensor nodes each including a sensor and a wireless device and being capable of performing multi-hop communication; divide the sensor node group into a plurality of clusters such that each of the clusters includes at least one partial cluster including a relay node and a child node that performs wireless communication; collect an average of sensing values in each of the partial clusters from the relay node of each of the partial clusters; calculate a calibration reference value of each of the clusters from the collected averages of the respective partial clusters; and provide the calculated calibration reference value of each of the clusters to each of the clusters.

7 Claims, 15 Drawing Sheets

(56) References Cited

U.S. PATENT DOCUMENTS

| | | |
|---|---|---|
| 2009/0228318 A1 | 9/2009 | Ara et al. |
| 2009/0268909 A1 | 10/2009 | Girao et al. |
| 2015/0208464 A1* | 7/2015 | Heo .............. H04W 84/18 |
| | | 702/189 |
| 2016/0247394 A1* | 8/2016 | Stenneth .............. G08G 1/0112 |

FOREIGN PATENT DOCUMENTS

| | | |
|---|---|---|
| JP | 2005-221386 | 8/2005 |
| JP | 2006-135911 | 5/2006 |
| JP | 2007-41660 | 2/2007 |
| JP | 2009-211574 | 9/2009 |
| JP | 2009-540709 | 11/2009 |
| WO | WO 2007/144106 A1 | 12/2007 |

OTHER PUBLICATIONS

Written Opinion of the International Search Authority dated Jun. 2, 2015 corresponding to International Patent Application No. PCT/JP2015/057562.

Office Action, dated Jul. 1, 2019, in Chinese Application No. 201580077598.7 (14 pp.).

* cited by examiner

FIG.6

| IDENTIFICATION INFORMATION OF PARTIAL CLUSTER (IDENTIFICATION INFORMATION OF PARENT NODE) | IDENTIFICATION INFORMATION OF CHILD NODE | AVERAGE OF SENSING VALUES |
|---|---|---|
| 50-1 | 50-3 | $\alpha 1$ |
|  | 50-4 |  |
| 50-2 | 50-5 | $\alpha 2$ |
| 50-4 | 50-6 | $\alpha 3$ |
|  | 50-7 |  |

FIG.7

| DESTINATION ADDRESS (IDENTIFICATION INFORMATION OF PARTIAL CLUSTER) | CALIBRATION REFERENCE VALUE |
|---|---|
| 50-1 | $\beta 1$ |

FIG.9

| IDENTIFICATION INFORMATION OF PARTIAL CLUSTER (IDENTIFICATION INFORMATION OF PARENT NODE) | IDENTIFICATION INFORMATION OF CHILD NODE | AVERAGE OF SENSING VALUES |
|---|---|---|
| 50-1 | 50-3 | $\alpha 1$ |
| | 50-4 | |

FIG.14

| IDENTIFICATION INFORMATION OF PARTIAL CLUSTER (IDENTIFICATION INFORMATION OF PARENT NODE) | AVERAGE OF SENSING VALUES | IDENTIFICATION INFORMATION OF CHILD SENSOR NODE | SENSING VALUE | AVERAGE OF SENSING VALUES |
|---|---|---|---|---|
| 50-1 | SENSING VALUE (50-1) | 50-3 | SENSING VALUE (50-3) | α1 |
| | | 50-4 | SENSING VALUE (50-4) | |

FIG.15

| IDENTIFICATION INFORMATION OF PARTIAL CLUSTER (IDENTIFICATION INFORMATION OF PARENT NODE) | AVERAGE OF SENSING VALUES | IDENTIFICATION INFORMATION OF CHILD SENSOR NODE | SENSING VALUE | AVERAGE OF SENSING VALUES |
|---|---|---|---|---|
| 50-1 | SENSING VALUE (50-1) | 50-3 | SENSING VALUE (50-3) | α1 |
|  |  | 50-4 | SENSING VALUE (50-4) |  |
| 50-2 | SENSING VALUE (50-2) | 50-5 | SENSING VALUE (50-5) | α2 |
| 50-4 | SENSING VALUE (50-4) | 50-6 | SENSING VALUE (50-6) | α3 |
|  |  | 50-7 | SENSING VALUE (50-7) |  |

FIG.16

| SENSOR NODE | TEMPERATURE ||
| --- | --- | --- |
| | SENSING VALUE | DEVIATION |
| #A | 63 | 0.5 |
| #B | 60 | 2.5 |
| #C | 118 | 55.5 |
| #D | 62 | 0.5 |
| AVERAGE (AVERAGE) | 75.8 | |
| MEDIAN (MEDIAN) | 62.5 | |
| AVERAGE EXCLUDING OUTLIER (TRIM MEAN) | 61.7 | |

FIG.17

| DESTINATION ADDRESS (IDENTIFICATION INFORMATION OF PARTIAL CLUSTER) | IDENTIFICATION INFORMATION OF SENSOR NODE AS TARGET OF COMMAND SIGNAL FOR TRANSITION |
| --- | --- |
| 50-1 | 50-4 |

CONTROL DEVICE, SENSOR NODE, AND COMPUTER-READABLE RECORDING MEDIUM

CROSS-REFERENCE TO RELATED APPLICATION

This application is a continuation application of International Application No. PCT/JP2015/057562, filed on Mar. 13, 2015 and designating the U.S., the entire contents of which are incorporated herein by reference.

FIELD

The embodiments discussed herein are related to a control device, a sensor node, and a computer-readable recording medium.

BACKGROUND

In recent years, a "wireless sensor network" has been proposed, in which sensor nodes including wireless communication units and sensors are arranged in an observation area and pieces of sensing information are collected with a "collection period (i.e., sampling period of sensing values". For example, each of sensor nodes in a wireless sensor network includes an energy harvesting unit that generates electricity by converting environmental energy (for example, sunlight, vibrations, or the like) into electrical energy, and includes a battery that stores the electricity generated by the energy harvesting unit. Each of the sensor nodes operates by using the electricity stored in the battery.

Furthermore, a sensing value measured by each of the sensor nodes in the wireless sensor network is reported to a "control device" (i.e., network device)" via a gateway device. Here, the wireless sensor network has a tree topology, for example. Specifically, the wireless sensor network includes a sensor node in a "relay operation state" (i.e., a "relay node") for relaying transmission of sensing values measured by other sensor nodes, and a sensor node in a "non-relay operation state" (i.e., an "end node"). The sensing value measured by each of the sensor nodes is transmitted from each of the sensor nodes to the gateway device directly or via one or more relay nodes. That is, the wireless sensor network includes a "multi-hop communication path".

Patent Document 1: Japanese Laid-open Patent Publication No. 2003-271231

Incidentally, the sensing values vary among the sensors due to various causes. For example, firstly, the sensing values vary due to individual differences among the sensors (a first cause of variation). Furthermore, secondly, the sensing values vary due to individual differences among devices equipped with the sensors (manufacturing precision or the like) (a second cause of variation). Thirdly, the sensing values vary depending on the environment in which the sensors are installed (for example, vibrations, wind, rain, mischief, or the like) (a third cause of variation).

Meanwhile, for example, with respect to the first cause of variation and the second cause of variation, it may be possible to take a countermeasure such as performing calibration before shipping a sensor node. Furthermore, with respect to the third cause of variation, it may be possible to take a countermeasure such as designing a housing of a sensor node so as not to be influenced by an external factor.

However, each of the countermeasures has a problem such as an increase in the load of a calibration process or an increase in the cost for the countermeasures.

SUMMARY

According to an aspect of the embodiments, a control device includes: a processor configured to: control calibration of sensing values in a sensor node group formed of sensor nodes each including a sensor and a wireless device and being capable of performing multi-hop communication; divide the sensor node group into a plurality of clusters such that each of the clusters includes at least one partial cluster including a relay node and a child node that performs wireless communication; collect an average of sensing values in each of the partial clusters from the relay node of each of the partial clusters; calculate a calibration reference value of each of the clusters from the collected averages of the respective partial clusters; and provide the calculated calibration reference value of each of the clusters to each of the clusters.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a first association table in the first embodiment;

FIG. 7 is a diagram illustrating an example of the format of a packet used when a calibration reference value is transmitted from the server in the first embodiment;

FIG. 9 is a diagram illustrating an example of the format of a packet used when an average of sensing values is transmitted from a parent node to the server in the first embodiment;

FIG. 14 is a diagram illustrating an example of the format of a packet used when an average of sensing values is transmitted from a parent node to a server in a second embodiment;

FIG. 15 is a diagram illustrating an example of a second association table in the second embodiment;

FIG. 16 is a diagram for explaining a method of calculating a calibration reference value in the second embodiment; and FIG. 17 is a diagram illustrating an example of the format of a command signal for transition to a relay dedicated node in the second embodiment.

DESCRIPTION OF EMBODIMENT

Preferred embodiments will be explained with reference to accompanying drawings. The control device, the control program, and the sensor node disclosed in the present application are not limited by the embodiments. Furthermore, in the embodiments, components having the same functions are denoted by the same signs, and the same explanation will be omitted.

[a] First Embodiment

Outline of a Wireless Sensor Network System

FIGS. 1 to 4 are diagrams for explaining a wireless sensor network system in a first embodiment. In FIGS. 1 to 4, a procedure for configuring the wireless sensor network system is illustrated in order of FIGS. 1, 2, 3, and 4.

In FIGS. 1 to 4, a wireless sensor network system 1 includes a server 10 serving as a control device, a gateway (GW) 30 that is directly or indirectly connected to the server 10 through wire, and sensor nodes 50-1 to 7. When the sensor nodes 59-1 to 7 are not specifically distinguished from one another, they may collectively be referred to as "sensor nodes 50". Here, the numbers of the gateway 30 and the sensor nodes 50 are respectively set to 1 and 7, but are not limited thereto.

Figure 4:
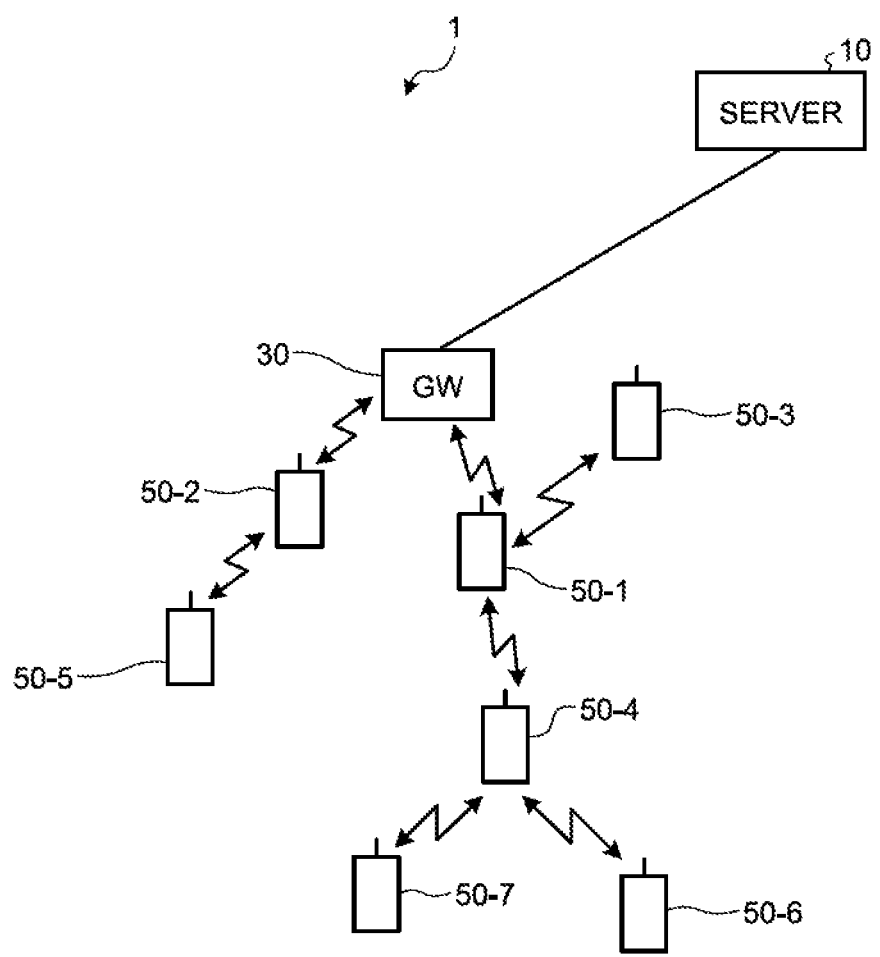
FIG. 4 is a diagram for explaining the wireless sensor network system in the first embodiment.

A topology in the wireless sensor network system 1 illustrated in FIG. 4 is an example of a result obtained by configuring a network in accordance with a "network configuration procedure". The "network configuration procedure" is described below.

Figure 1:
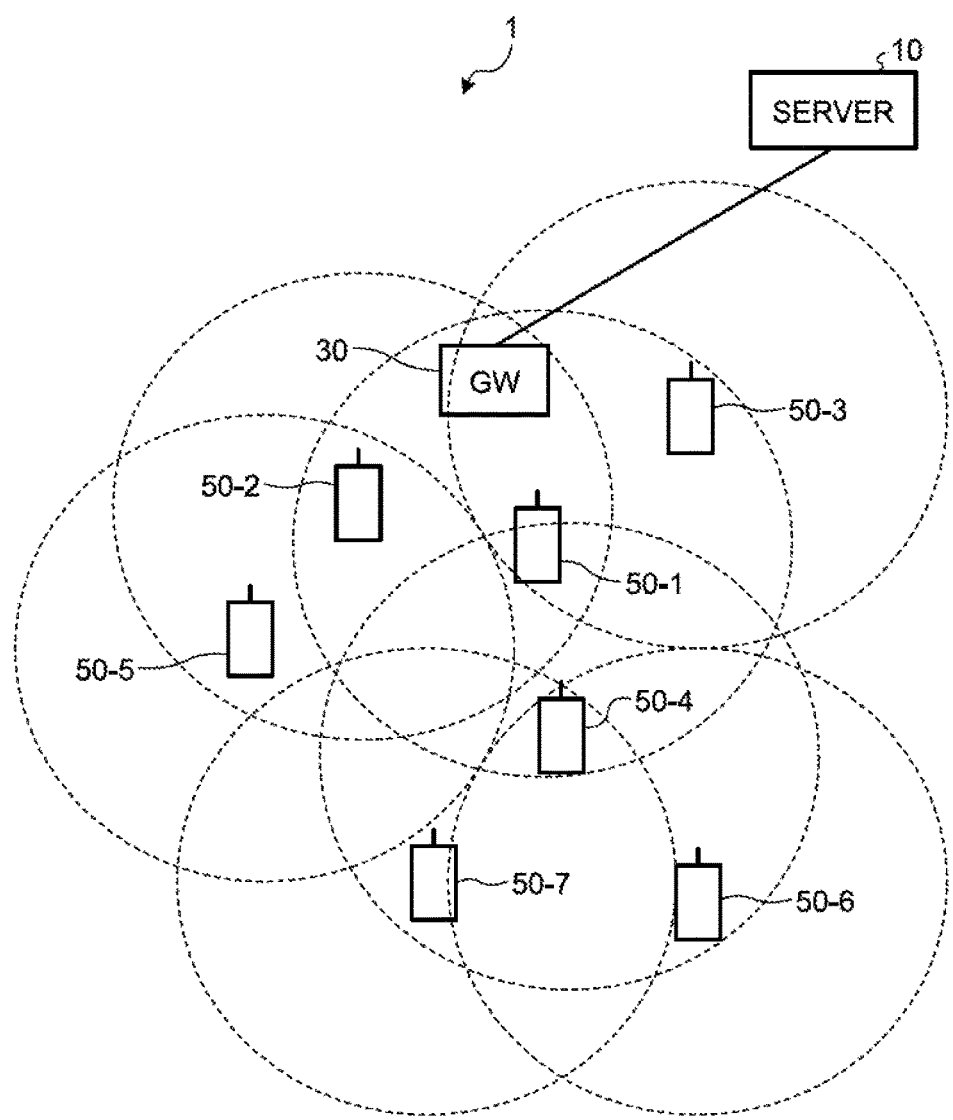
FIG. 1 is a diagram for explaining a wireless sensor network system in a first embodiment.

First, as illustrated in FIG. 1, in an "initial state" of the wireless sensor network system 1, networks are not established between the gateway 30 and the sensor nodes 50-1 to 7. The wireless sensor network system 1 may enter the initial state before operation of the wireless sensor network system 1 is started or every time a "command signal for network configuration (reconfiguration)" is transmitted at a predetermined time interval from the server 10 to the gateway 30 and the sensor nodes 50-1 to 7.

As illustrated in FIG. 1, in the "initial state" of the wireless sensor network system 1, each of the sensor nodes 50-1 to 7 transmits a "beacon". That is, in the "initial state", all of the sensor nodes 50 operate in a "child node mode". In FIG. 1, circles (dotted lines) about the respective sensor nodes 50 indicate areas in which the transmitted "beacons" arrive with the reception power of a predetermined level or higher.

Subsequently, upon receiving a beacon, the gateway 30 transmits a "link generation signal" to the sensor node 50 serving as a transmission source of the beacon. Specifically, the gateway 30 accepts, as own "child node", the sensor node 50 serving as the transmission source of the beacon. Incidentally, the "link generation signal" may be referred to as an "acceptance approval signal". Here, the number of the "child nodes" that can be accepted by a single "parent node" is limited (hereinafter, the number may be referred to as a "partial cluster size limit"). Here, explanation will be given based on the assumption that the "partial cluster size limit" is set to 2.

Figure 2:
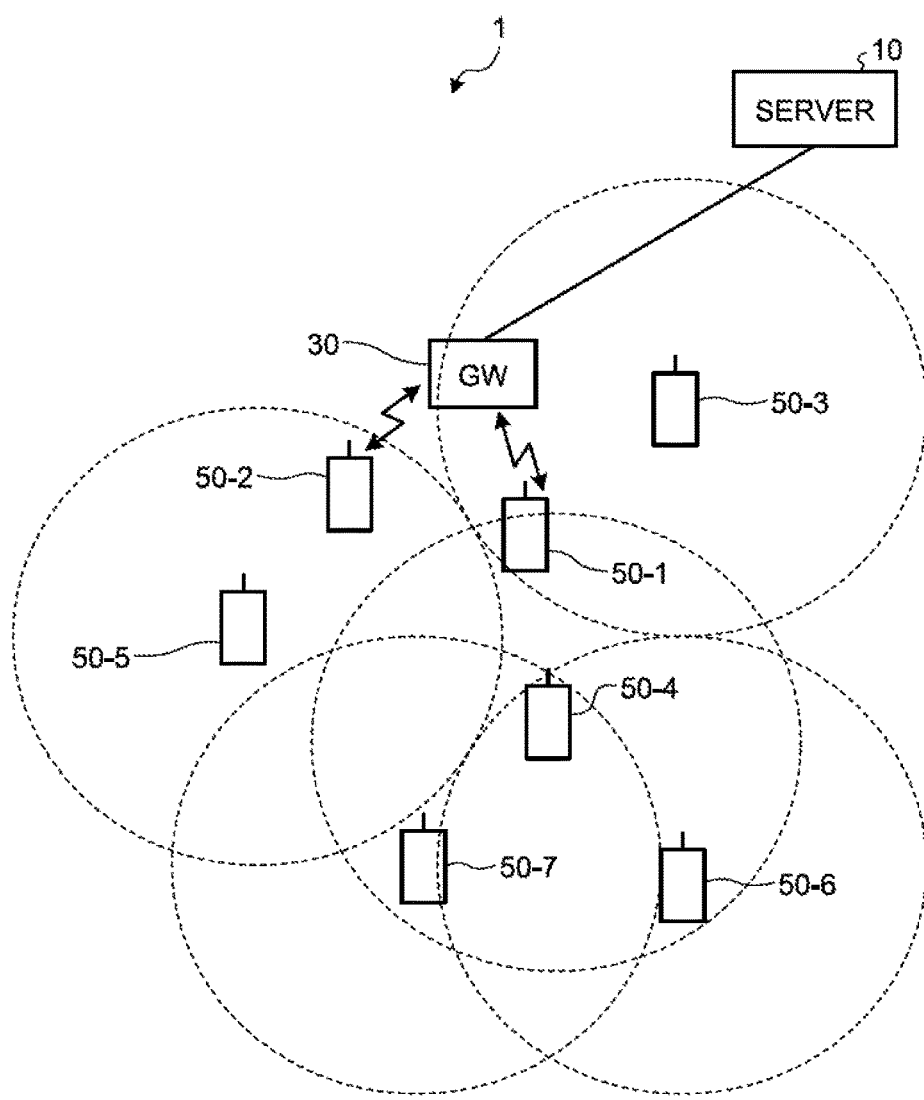
FIG. 2 is a diagram for explaining the wireless sensor network system in the first embodiment.

In FIG. 1, the gateway 30 is located in a position in which a beacon transmitted from each of the sensor nodes 50-1, 2, and 3 are receivable, and therefore can accept two of the sensor nodes 50-1, 2, and 3 as own "child nodes". Here, for example, the beacons are received from the sensor nodes 50-1, 2, and 3 in this order, and the gateway 30 generates a wireless link with each of the sensor nodes 50-1 and 2 as illustrated in FIG. 2. The sensor nodes 50-1 and 2 that are accepted as the "child nodes" by the gateway 30 stop transmission of the beacons as illustrated in FIG. 2. Therefore, it is possible to prevent the sensor nodes 50-1 and 2 from being accepted as "child nodes" of other nodes (the sensor nodes 50) other than the gateway 30. According to this "rule", the "topology" in the wireless sensor network system 1 is formed in a tree structure.

Then, the gateway 30 serving as a "parent node" transmits an "instruction signal for switching" to a "parent node mode" to the own "child nodes", i.e., to the sensor nodes 50-1 and 2.

Upon receiving the above-described "instruction signal for switching", each of the sensor nodes 50-1 and 2 starts to operate in the "parent node mode".

For example, upon receiving a beacon, the sensor node 50-1 transmits the "link generation signal" to the sensor node 50 serving as a transmission source of the beacon. That is, the sensor node 50-1 accepts, as own "child node", the sensor node 50 serving as the transmission source of the beacon.

Figure 3:
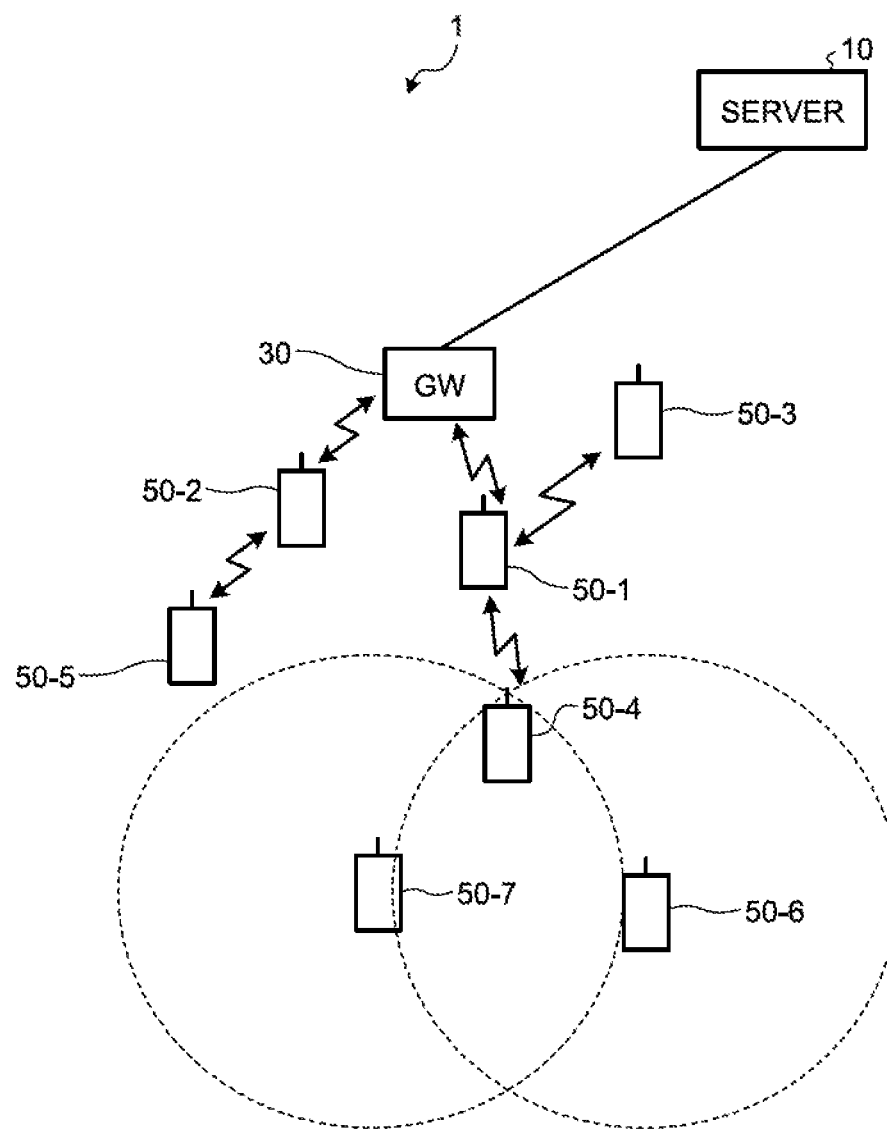
FIG. 3 is a diagram for explaining the wireless sensor network system in the first embodiment.

In FIG. 2, the sensor node 50-1 is located in a position in which a beacon transmitted from each of the sensor nodes 50-3 and 4 are receivable, and therefore can accept the sensor nodes 50-3 and 4 as own "child nodes". Therefore, as illustrated in FIG. 3, the sensor node 50-1 generates a wireless link with each of the sensor nodes 50-3 and 4. The sensor nodes 50-3 and 4 that are accepted as the "child nodes" toy the sensor node 50-1 stop transmission of the beacons as illustrated in FIG. 3. Hereinafter, a group formed of a "relay node" and "child nodes" of the relay node, such as the sensor node 50-1 serving as the "parent node" and the sensor nodes 50-3 and 4 serving as the "child nodes", may be referred to as a "partial cluster".

Then, the sensor node 50-1 transmits an "instruction signal for transmission" of a sensing value to the own child nodes, i.e., to the sensor nodes 50-3 and 4. Upon receiving the "instruction signal for transmission", each of the sensor nodes 50-3 and 4 transmits a sensing value of own sensor to the sensor node 50-1 that is own "parent node".

Subsequently, the sensor node 50-1 calculates an "average of sensing values" in own "partial cluster". Specifically, the sensor node 50-1 calculates an average of a sensing value of own sensor and the sensing values respectively reported from the sensor nodes 50-3 and 4. Then, the sensor node 50-1 transmits the calculated "average of sensing values" to the server 10 via the gateway 30 that is own parent node. At this time, the sensor node 50-1 serving as the parent node transmits, to the server 10, the average of the sensing values of the own partial cluster and identification information of each of the sensor nodes 50 included in the own partial cluster.

Meanwhile, the sensor node 50-2 performs the same process as performed by the sensor node 50-1. Specifically, the sensor node 50-2 accepts the sensor node 50-5 as own child node, and calculates an average of a sensing value of own sensor and a sensing value reported from the sensor node 50-5. Then, the sensor node 50-2 transmits the calculated "average of sensing values" to the server 10 via the gateway 30 that is own parent node.

Subsequently, each of the sensor nodes 50-1 and 2 transmits the "instruction signal for switching" to the "parent node mode" to the own "child nodes".

Upon receiving the above-described "instruction signal for switching", each of the sensor nodes 50-3, 4, and 5 starts to operate in the "parent node mode".

For example, upon receiving a beacon, the sensor node 50-4 transmits the "link generation signal" to the sensor node 50 serving as a transmission source of the beacon. That is, the sensor node 50-4 accepts, as own "child node", the sensor node 50 serving as the transmission source of the beacon.

In FIG. 3, the sensor node 50-4 is located in a position in which a beacon transmitted from each of the sensor, nodes 50-6 and 7 are receivable, and therefore can accept the sensor nodes 50-6 and 7 as own "child nodes". Therefore, as illustrated in FIG. 4, the sensor node 50-4 generates a wireless link with each of the sensor nodes 50-6 and 7. The sensor nodes 50-6 and 7 that are accepted as the "child nodes" by the sensor node 50-4 stop transmission of beacons as illustrated in FIG. 4. Incidentally, in the example illustrated in FIG. 1 to FIG. 4, the sensor nodes 50-6 and 7 operate as end nodes.

Then, the sensor node 50-4 transmits the "instruction signal for transmission" of a sensing value to the own child nodes, i.e., to the sensor nodes 50-6 and 7. Upon receiving the "instruction signal for transmission", each of the sensor nodes 50-6 and 7 transmits a sensing value of own sensor to the sensor node 50-4 that is own "parent node".

Subsequently, the sensor node 50-4 calculates an "average of sensing values" in own "partial cluster". Specifically, the sensor node 50-4 calculates an average of a sensing value of own sensor and the sensing values respectively reported from the sensor nodes 50-6 and 7. Then, the sensor node 50-4 transmits the calculated "average of sensing values" to the server 10 via the sensor node 50-1 that is own parent node.

Meanwhile, the server 10 divides a plurality of the sensor nodes 50 in the wireless sensor network system 1 into a plurality of "clusters" each including at least one partial cluster, based on the number of the sensor nodes 50. For example, the server 10 sets the number of the sensor nodes 50 to be included in a single cluster to 5 (hereinafter, the number may be referred to as a "cluster size limit"). In this case, the number of configuration nodes in a partial cluster 1, which includes the sensor node 50-1 and the sensor nodes 50-3 and 4, and in a partial cluster 2, which includes the sensor node 50-2 and the sensor node 50-5, is 5; therefore, the partial cluster 1 and the partial cluster 2 are combined into a cluster 1. Furthermore, the sensor nodes 50-6 and 7 that are not included in the cluster 1 form a partial cluster if other sensor nodes 50 are located nearby, and the formed partial cluster is classified into a different cluster other than the cluster 1 by the server 10.

Then, the server 10 calculates a "calibration reference value" based on an average of sensing values of the partial cluster included in a cluster, for each cluster. For example, if a certain cluster includes a plurality of partial clusters, the server 10 calculates the "calibration reference value" of the cluster by obtaining a weighted average based on a plurality of averages of sensing values corresponding to the respective partial clusters and the number, of the sensor nodes 50 included in each of the partial clusters.

Then, the server 10 transmits the "calibration reference value" calculated for each of the clusters to each of the sensor nodes 50 included in each of the clusters by using multi-hop communication.

Subsequently, each of the sensor nodes 50, upon receiving the "calibration reference value" sent thereto, performs a calibration process by using the "calibration reference value". Specifically, each of the sensor nodes 50 calculates an "error value" by subtracting the received "calibration reference value" from the sensing value of own sensor. Then, each of the sensor nodes 50 corrects the sensing value by adding the calculated "error value" to the sensing value of the own sensor for each "collection period" described above, and reports the corrected sensing value to the server 10 via own parent node.

By performing the calibration process in the wireless sensor network system 1 as described above, it is possible to avoid performing the calibration process separately before shipping the sensor nodes 50; therefore, it is possible to reduce the processing load of the calibration process. Furthermore, by performing the calibration process in the network configuration procedure for the wireless sensor network system 1, it is possible to eliminate redundant processes in the network configuration procedure and the calibration process; therefore, it is possible to further reduce the processing load of the calibration process.

Configuration Example of the Server

Figure 5:
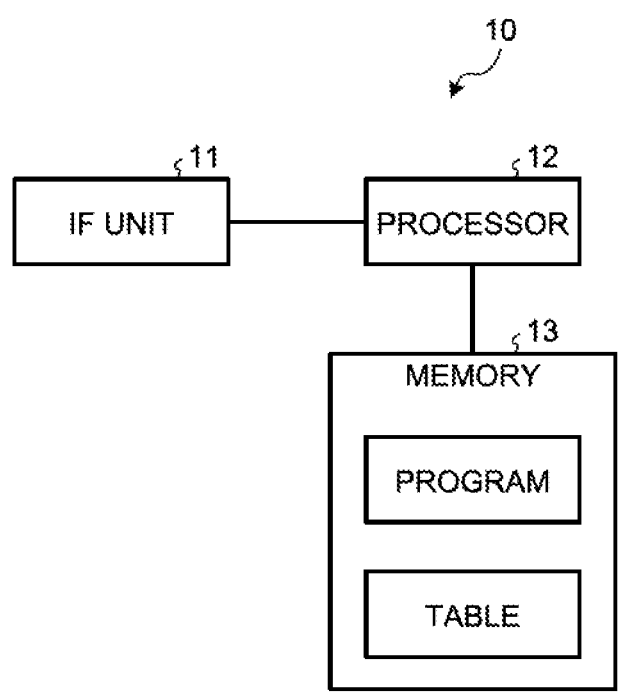
FIG. 5 is a block diagram illustrating an example of a server in the first embodiment.

FIG. 5 is a block diagram illustrating an example of the server in the first embodiment. In FIG. 5, the server 10 includes an interface (IF) unit 11, a processor 12, and a memory 13. Examples of the processor 12 include a CPU, a Digital Signal Processor (DSP), and a Field Programmable Gate Array (FPGA). Furthermore, examples of the memory 13 include a Random Access Memory (RAM) such as a Synchronous Dynamic Random Access Memory (SDRAM), a Read Only Memory (ROM), and a flash memory. Various processing functions executed by the processor 12 are implemented by recording a program corresponding to each of the various processing functions in the memory 13 and causing the processor 12 to execute the programs.

The interface unit 11 is an interface that directly or indirectly communicates with the gateway 30 through wire. The interface unit 11 receives various signals transmitted from the sensor node 50 via the gateway 30 and outputs the various signals to the processor 12. Furthermore, the interface unit 11 transmits various signals received from the processor 12 to each of the sensor nodes 50 via the gateway 30.

The processor 12 stores, in the memory 13, a "first association table" in which an average of sensing values and identification information of each of the sensor nodes 50 included in a partial cluster, which are transmitted from a relay node of each of partial clusters, are associated with each other.

FIG. 6 is a diagram illustrating an example of the first association table in the first embodiment. In FIG. 6, in the first association table, identification information of each of partial clusters (for example, identification information of a parent node), identification information of a child node included in each of the partial clusters, and an average of sensing values of each of the partial clusters are associated with one another. In the example of the topology illustrated in FIG. 4, identification information of a partial cluster (50-1) for determining the sensor node 50-1 as a parent node, the sensor nodes 50-3 and 4 that are child nodes of the partial cluster (50-1), and an average $\alpha 1$ of sensing values of the partial cluster (50-1) are associated with one another.

Furthermore, the processor 12 divides a plurality of the sensor nodes 50 in the wireless sensor network system 1 into a plurality of "clusters" such that each of the clusters includes at least one partial cluster, based on the number of the sensor nodes 50. For example, the processor 12 forms a cluster by combining a plurality of partial clusters in the range below the "cluster size limit".

Then, the processor 12 calculates a "calibration reference value" based on an average of sensing values of the partial cluster included in a cluster, for each cluster. For example, if a certain cluster includes a plurality of partial clusters, the processor 12 calculates the "calibration reference value" of the cluster by obtaining a weighted average based on a plurality of averages of sensing values corresponding to the respective partial clusters and the number of the sensor nodes 50 included in each of the partial clusters.

Then, the processor 12 outputs, to the IF unit 11, the "calibration reference value" calculated for each of the clusters and the identification information of the partial clusters included in each of the clusters (for example, the identification information of the parent node of each of the partial clusters). Consequently, the "calibration reference value" calculated for each of the clusters and the identification information of each of the sensor nodes 50 included in each of the clusters are transmitted to each of the sensor nodes 50 included in each of the clusters through the gateway 30 and multi-hop communication.

FIG. 7 is a diagram illustrating an example of the format of a packet used when the calibration reference value is transmitted from the server in the first embodiment. As illustrated in FIG. 7, for example, the server 10 transmits a packet that includes the partial cluster (50-1) as a "destination address" and includes α1 as a "calibration reference value". In the example illustrated in FIG. 4, the partial cluster (50-2) is also included in the same cluster as the partial cluster (50-1). Therefore, the server 10 also transmits a packet that includes the partial cluster (50-2) as the "destination address" and includes β1 as the "calibration reference value". The calibration reference value transmitted to the parent node of the partial cluster is transferred to the child node by the parent node.

The memory 13 stores therein various kinds of information transmitted from the sensor node 50 and various kinds of information calculated by the processor 12.

Configuration Example of the Sensor Node

Figure 8:
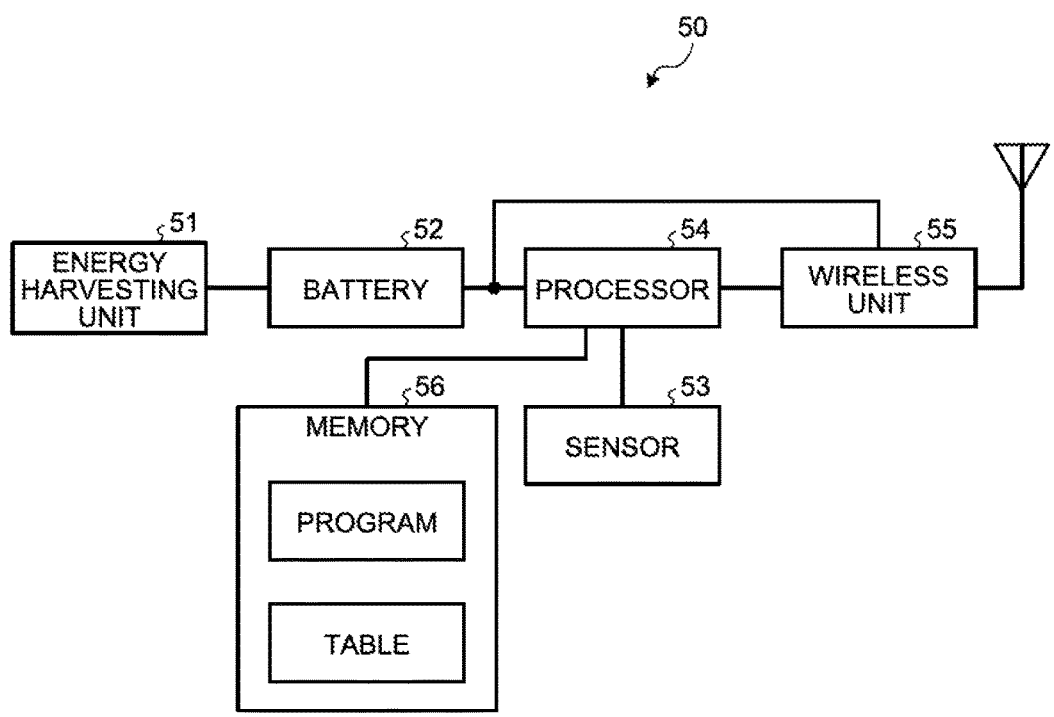
FIG. 8 is a block diagram illustrating an example of a sensor node in the first embodiment.
Figure 10:
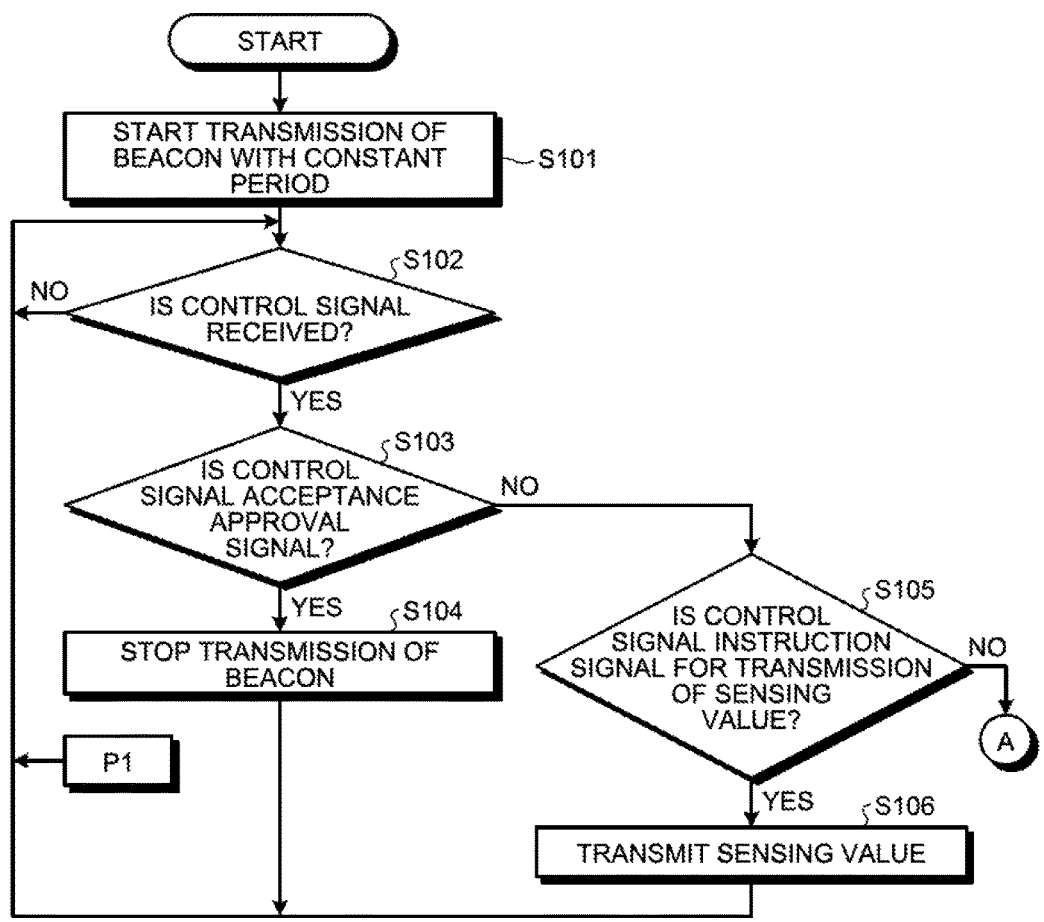
FIG. 10 is a flowchart illustrating an example of processing operation of the sensor node in the first embodiment.
Figure 11:
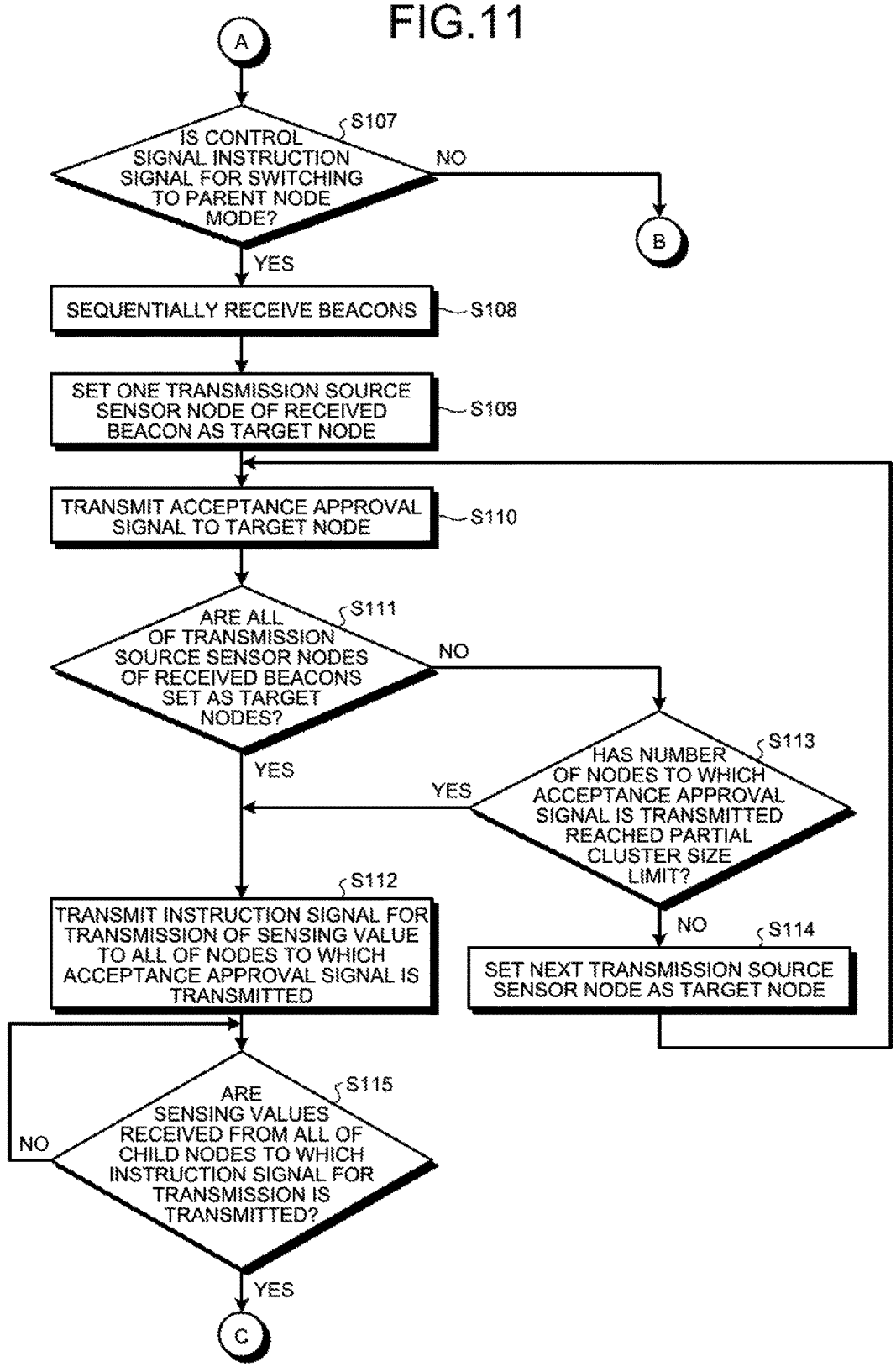
FIG. 11 is a flowchart continued from FIG. 10.
Figure 12:
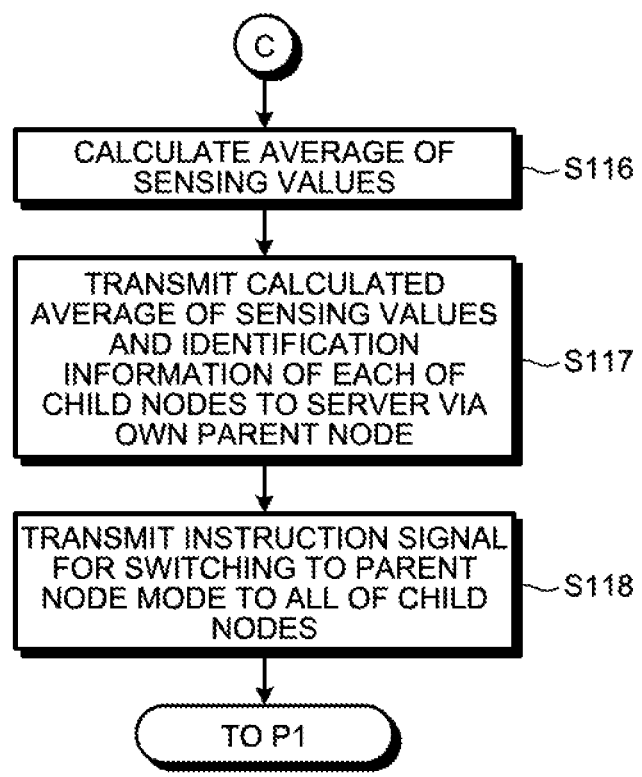
FIG. 12 is a flowchart continued from FIG. 11.
Figure 13:
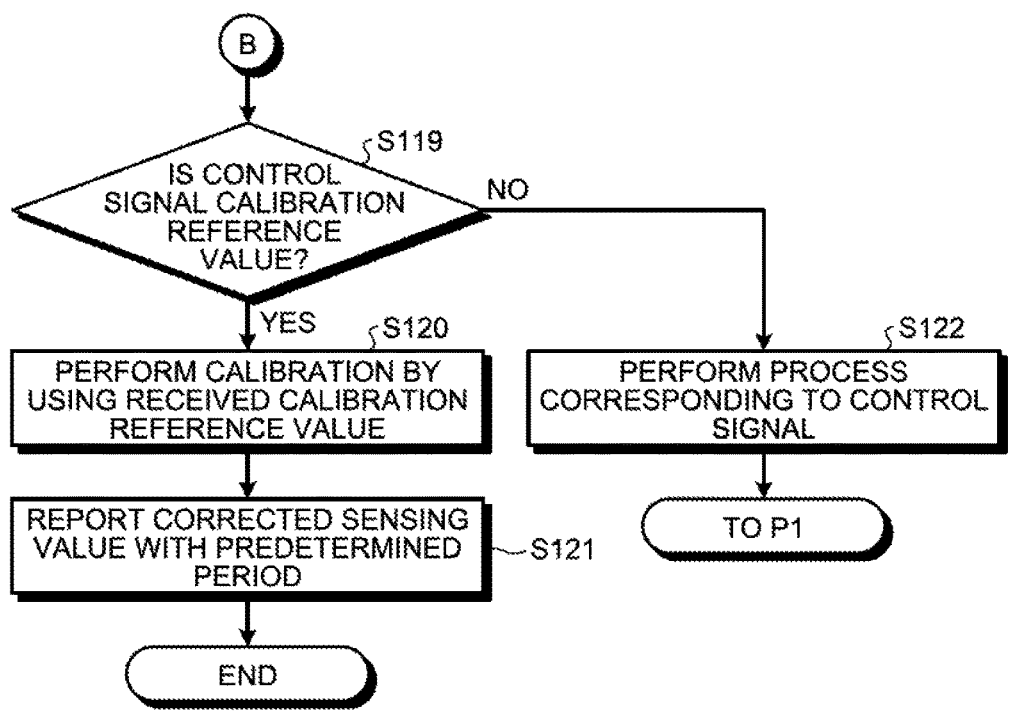
FIG. 13 is a flowchart continued from FIG. 11.

FIG. 8 is a block diagram illustrating an example of the sensor node in the first embodiment. In FIG. 8, the sensor node 50 includes an energy harvesting unit 51, a battery 52, a sensor 53, a processor 54, a wireless unit 55, and a memory 56. Examples of the processor 54 include a GPU, a Digital Signal Processor (DSP), and a Field Programmable Gate Array (FPGA). Furthermore, examples of the memory 56 include a Random Access Memory (RAM) such as a Synchronous Dynamic Random Access Memory (SDRAM), a Read Only Memory (ROM), and a flash memory. Various processing functions executed by the processor 54 are implemented by recording a program corresponding to each of the various processing functions in the memory 56 and causing the processor 54 to execute the programs.

The energy harvesting unit 51 generates electricity by using environmental energy (for example, sunlight, vibrations, or the like) and outputs the generated electricity to the battery 52.

The battery 52 stores the electricity generated by the energy harvesting unit 51 and supplies the stored electricity to the processor 54 and the wireless unit 55.

The sensor 53 outputs a measured sensing value to the processor 54.

The processor 54 receives a control signal via an antenna and the wireless unit 55 and controls a process corresponding to the received control signal.

For example, upon receiving the "command signal for network configuration (reconfiguration)" transmitted from the server 10, the processor 54 causes the subject sensor node to shift to the "child node mode". Then, the processor 54 generates a "beacon" and transmits the generated beacon via the wireless unit 55 and the antenna with a predetermined period. Furthermore, upon receiving the "acceptance approval signal" transmitted from a parent node of the subject sensor node, the processor 54 stops transmission of the beacon.

Moreover, upon receiving the "instruction signal for transmission" of a sensing value, the processor 54 transmits a sensing value measured by the sensor 53 to the parent node of the subject sensor node via the wireless unit 55 and the antenna.

Furthermore, upon receiving the "instruction signal for switching" to the parent node mode, the processor 54 causes the subject sensor node to shift to the "parent node mode". Then, upon receiving a beacon via the antenna and the wireless unit 55, the processor 54 transmits the "link generation signal" to the sensor node 50 serving as a transmission source of the beacon. The processor 54 transmits the link generation signal to the sensor nodes 50 serving as transmission sources of received beacons up to the above-described "partial cluster size limit" which is the upper limit. Specifically, the processor 54 accepts, as child nodes of the subject sensor node, the sensor nodes 50 serving as the transmission sources of the received beacons up to the above-described "partial cluster size limit" which is the upper limit. Then, the processor 54 transmits the "instruction signal for transmission" of a sensing value to the child nodes of the subject sensor node. Subsequently, upon receiving the sensing values from the child nodes in response to the transmitted "instruction signal for transmission", the processor 54 calculates an "average of sensing values" in a partial cluster in which the subject sensor node serves as a relay node. Then, the processor 54 transmits the calculated "average of sensing values" to the server 10 via the parent node of the subject sensor node. Subsequently, the processor 54 transmits the "instruction signal for switching" to the parent node mode to the child nodes of the subject sensor node.

FIG. 9 is a diagram illustrating an example of the format of a packet used when an average of sensing values is transmitted from the parent node to the server in the first embodiment. In FIG. 9, a payload portion of a packet is specifically illustrated. As illustrated in FIG. 9, in the payload portion, identification information of a partial cluster (for example, identification information of a parent node), identification information of a child node included in the partial cluster, and an average of sensing values of the partial cluster are stored in an associated manner. In the example of the topology illustrated in FIG. 4, in the payload, the identification information of the partial cluster (50-1) for determining the sensor node 50-1 as a parent node, the sensor nodes 50-3 and 4 that are child nodes of the partial cluster (50-1), and the average α1 of sensing values of the partial cluster (50-1) are stored in an associated manner.

Furthermore, upon receiving the "calibration reference value" transmitted from the server 10, the processor 54 performs the calibration process. Specifically, the processor 54 calculates an "error value" by subtracting the received "calibration reference value" from the sensing value of the sensor 53. Then, the processor 54 corrects the sensing value by adding the calculated "error value" to the sensing value of the sensor 53 for each "collection period" described above, and reports the corrected sensing value to the server 10 via own parent node.

Example of Operation of the Wireless Sensor Network System

An example of processing operation performed by the wireless sensor network system 1 configured as described above will be described. Here, an example of processing operation performed by the sensor node 50 will mainly be described. FIG. 10 to FIG. 13 are flowcharts illustrating an example of the processing operation performed by the sensor node in the first embodiment. For example, the process flow illustrated in FIG. 10 to FIG. 13 is performed before operation of the wireless sensor network system 1 is started or every time the "command signal for network configuration (reconfiguration)" is transmitted at a predetermined time interval from the server 10 to the gateway 30 and the sensor nodes 50-1 to 7.

If the wireless sensor network system 1 enters the above-described "initial state", the processor 54 in the sensor node 50 starts to transmit a beacon with a constant period (Step S101). As described above, when the wireless sensor network system 1 is in the "initial state", for example, all of the sensor nodes 50 have shifted to the "child node mode".

The processor 54 waits to receive a control signal (NO at Step S102), and upon receiving the control signal (YES at Step S102), determines whether the received control signal is the "acceptance approval signal", i.e., the "link generation signal" (Step S103).

If the received control signal is the "acceptance approval signal" (YES at Step S103), the processor 54 stops transmission of the beacon because the subject sensor node is accepted as a child node (Step S104). Then, the process step returns to Step S102.

If the received control signal is not the "acceptance approval" (NO at Step S103), the processor 54 determines whether the received control signal is the "instruction signal for transmission" of a sensing value (Step S105).

If the received control signal is the "instruction signal for transmission" (YES at Step S105), the processor 54 transmits a sensing value measured by the sensor 53 of the subject sensor node to a parent node of the subject sensor node, where the parent node is a transmission source of the "instruction signal for transmission" (Step S106). Then, the process step returns to Step S102.

If the received control signal is not the "instruction signal for transmission" (NO at Step S105), the processor 54 determines whether the received control signal is the "instruction signal for switching" to the parent node mode (Step S107).

If the received control signal is the "instruction signal for switching" to the parent node mode (YES at Step S107), the processor 54 sequentially receives beacons via the antenna and the wireless unit 55 (Step S108).

The processor 54 sets one transmission source sensor node of the received beacon as a "target node" (Step S109).

The processor 54 transmits the "acceptance approval signal", i.e., the "link generation signal" to the target node (Step S110).

The processor 54 determines whether all of the transmission source sensor nodes of the received beacons are set as the "target nodes" Step S111).

If all of the transmission source sensor nodes of the received beacons are set as the "target node" (YES at Step S111), the processor 54 transmits the "instruction signal for transmission" of a sensing value to all of the nodes to which the acceptance approval signal is transmitted (Step S112).

If all of the transmission source sensor nodes of the received beacons are not set as the "target node" (NO at Step S111), the processor 54 determines whether the number of the nodes to which the acceptance approval signal is transmitted has reached the "partial cluster size limit" (Step S113).

If the number of the nodes to which the acceptance approval signal is transmitted has not reached the "partial cluster size limit" (NO at Step S113), the processor 54 sets a next transmission source sensor node as the "target node" (Step S114). Then, the process step returns to Step S110. In contrast, if the number of the nodes to which the acceptance approval signal is transmitted has reached the "partial cluster size limit" (YES at Step S113), the process step proceeds to Step S112.

The processor 54 waits to receive sensing values from all of the child nodes to which the "instruction signal for transmission" of a sensing value is transmitted (NO at Step S115). Then, upon receiving the sensing values from all of the child nodes to which the "instruction signal for transmission" of a sensing value is transmitted (YES at step S115), the processor 54 calculates an "average of sensing values" in a partial cluster in which the subject sensor node serves as a relay node (Step S116).

The processor 54 transmits the calculated average of sensing values and identification information of each of the child nodes to the server 10 via the parent node of the subject sensor node (Step S117). Incidentally, the processor 12 in the server 10 divides a plurality of the sensor nodes 50 into a plurality of clusters such that each of the clusters includes at least, one partial cluster including a relay node and a child node that is directly and wirelessly connected to the relay node. Subsequently, the processor 12 collects an average of sensing values in each of the partial clusters from the relay node of each of the partial clusters, and calculates a calibration reference value of each of the clusters from the collected averages of the sensing values of the respective partial clusters. Then, the processor 12 provides the calculated calibration reference value of each of the clusters to each of the clusters through multi-hop communication.

The processor 54 transmits the "instruction signal for switching" to the parent node mode to all of the child nodes (Step S118). Then, the process step returns to Step S102.

If the received control signal is not the "instruction signal for switching" to the parent node mode (NO at Step S107), the processor 54 determines whether the received control signal is a "calibration reference value" (Step S119).

If the received control signal is the "calibration reference value" (YES at Step S119), the processor 54 performs a calibration process by using the received "calibration reference value" (Step S120). Specifically, the processor 54 calculates an "error value" by subtracting the received "calibration reference value" from the sensing value of the sensor 53 of the subject sensor node.

The processor 54 corrects the sensing value by adding the calculated "error value" to the sensing value of the sensor 53, and reports the corrected sensing value to the server 10 via the parent node of the subject sensor node for each "collection period" (Step S121).

If the received control signal is not the "calibration reference value" (NO at Step S119), the processor 54 performs a process corresponding to the received control signal (Step S122). Then, the process step returns to Step S102.

As described above, according to the first embodiment, the processor 12 in the server 10 divides a plurality of the sensor nodes 50 into a plurality of clusters such that each of the clusters includes at least one partial cluster including a relay node and a child node that is directly and wirelessly connected to the relay node. Subsequently, the processor 12 collects an average of sensing values in each of the partial clusters from the relay node of each of the partial clusters, and calculates a calibration reference value of each of clusters from the collected averages of the respective partial clusters. Then, the processor 12 provides the calculated calibration reference value of each of the clusters to each of the clusters through multi-hop communication.

With this configuration of the server 10, it is possible to perform the calibration process in the wireless sensor network system 1; therefore, it is possible to avoid performing the calibration process separately before shipping the sensor nodes 50. Consequently, it is possible to reduce the processing load of the calibration process.

Furthermore, if a first cluster among a plurality of clusters includes a plurality of partial clusters, the processor 12 calculates a calibration reference value of the first cluster by obtaining a weighted average based on a plurality of averages corresponding to the respective partial clusters and the number of the sensor nodes included in each of the partial clusters.

With this configuration of the server 10, it is possible to calculate the calibration reference value of a cluster by taking into account the size of each of the partial clusters; therefore, it is possible to improve the accuracy of calibration.

Furthermore, upon receiving the instruction signal for switching to the parent node mode, the processor 54 in the sensor node 50 receives a beacon transmitted from another sensor node located near the subject node, accepts the node serving as a transmission source of the received beacon as a child node of the subject node, and transmits the instruction signal for transmission of a sensing value to the child node. Subsequently, upon receiving the sensing value from the child node in response to the transmitted instruction signal for transmission, the processor 54 calculates an average of sensing values of a partial cluster including the subject node and the child node by obtaining an average of the sensing value of the subject node and the sensing value of the child node, transmits the calculated average of the sensing values to the server 10 through multi-hop communication, and transmits the instruction signal for switching to the parent node mode to the child node. Then, upon receiving the instruction signal for transmission of a sensing value, the processor 54 transmits the sensing value of the subject node to a node serving as a transmission source of the instruction signal for transmission.

With this configuration of the sensor node 50, it is possible to perform the calibration process in the network configuration procedure for the wireless sensor network system 1. Consequently, it is possible to eliminate redundant processes in the network configuration procedure and the calibration process; therefore, it is possible to further reduce the processing load of the calibration process.

[b] Second Embodiment

A second embodiment relates to an embodiment in which a sensing value determined as an "abnormal value (i.e., "outlier") is excluded from "use target values" to be used for calculating the calibration reference value, and a sensor node corresponding to the excluded sensing value is handled as a "relay dedicated node". Incidentally, basic configurations of a server and a sensor node in the second embodiment are the same as those of the server 10 and the sensor node 50 in the first embodiment; therefore, explanation will be given with reference to FIG. 5 and FIG. 8.

Configuration Example of the Sensor Node

The processor 54 in the sensor node 50 of the second embodiment, similarly to the first embodiment, upon receiving a sensing value transmitted from a child node in response to a transmitted "instruction signal for transmission" in the "parent node mode", calculates an "average of sensing values" in a partial cluster in which the subject sensor node serves as a relay node. Then, the processor 54 transmits sensing values of the subject sensor node and the child node of the subject sensor node in addition to the calculated "average of sensing values" to the server 10 via the parent node of the subject sensor node.

FIG. 14 is a diagram illustrating an example of the format of a packet used when the average of sensing values is transmitted from the parent node to the server in the second embodiment. In FIG. 14, a payload portion of a packet is specifically illustrated. As illustrated in FIG. 14, in the payload portion, identification information of a partial cluster (i.e., identification information of a parent node), a sensing value of the parent node, identification information of child nodes included in the partial cluster, a sensing value of each of the child nodes, and an average of sensing values of the partial cluster are stored in an associated manner.

Furthermore., the processor 54 in the sensor node 50 of the second embodiment, upon receiving a "command signal for transition to a relay dedicated node" transmitted to the subject sensor node from the server 10, causes the subject sensor node to shift to a "relay dedicated node mode". The "relay dedicated node" is a node that does not transmit a sensing value of the subject sensor node but transfers a sensing value of a child node of the subject sensor node at a timing of collecting a sensing value.

Configuration Example of the Server

The processor 12 in the server 10 of the second embodiment stores, in the memory 13, a "second association table" in which identification information of a partial cluster (i.e., identification information of a parent node), a sensing value of the parent node, identification information of child nodes included in the partial cluster, a sensing value of each of the child nodes, and an average of sensing values of the partial cluster, all of which are transmitted from the relay node of each of the partial clusters, in an associated manner.

FIG. 15 is a diagram illustrating an example of the second association table in the second embodiment. In FIG. 15, in the second association table, the identification information of the partial cluster (i.e., the identification information of the parent node), the sensing value of the parent node, the identification information of the child nodes included in the partial cluster, the sensing value of each of the child nodes, and the average of sensing values of the partial cluster are associated with one another.

Furthermore, similarly to the first embodiment, the processor 12 in the server 10 of the second embodiment divides a plurality of the sensor nodes 50 in the wireless sensor network system 1 into a plurality of "clusters" such that each of the clusters includes at least one partial cluster, based on the number of the sensor nodes 50. For example, the processor 12 forms a cluster by combining a plurality of partial clusters in the range below the "cluster size limit".

Incidentally, if an "outlier" is included in the sensing values collected for a certain cluster, the processor 12 in the server 10 of the second embodiment calculates a "calibration reference value" while excluding the sensing value corresponding to the outlier. For example, the processor 12 calculates an average excluding the outlier by using "Trim mean" based on the sensing value of each of the sensor nodes 50 included in a certain cluster, and uses the calculated average as the "calibration reference value". "Trim mean" is an algorithm conventionally used to calculate an average excluding an abnormal value.

FIG. 16 is a diagram for explaining a method of calculating the calibration reference value in the second embodiment. In FIG. 16, for simplicity of explanation, a cluster including four sensor nodes 50 described as sensor nodes #A to #D is illustrated as one example. In FIG. 16, "humidity" is used as one example of the sensing value. In FIG. 16, the sensing values (humidity values) of the sensor nodes #A to

D are "63", "60", "118", and "62", respectively. A simple average of these values is "75.8", and a median of these values is "62.5". If "Trim mean" is applied to the sensing values ("63", "60", "118", and "62") of the sensor nodes #A to #D, it is possible to calculate an average ("61.7") excluding an outlier ("118").

Then, similarly to the first embodiment, the processor 12 in the server 10 of the second embodiment outputs the "calibration reference value" calculated for each of the clusters and identification information of partial clusters included in each of the clusters (for example, identification information of a parent node of each, of the partial clusters) to the IF unit 11. Consequently, the "calibration reference value" calculated for each of the clusters and the identification information of each of the sensor nodes 50 included in each of the clusters are transmitted to each of the sensor nodes 50 included in each of the clusters through the gateway 30 and multi-hop communication.

Furthermore, the processor 12 in the server 10 of the second embodiment generates the above-described "command signal for transition to the relay dedicated node", which includes identification information of a partial cluster including the sensor node 50 corresponding to the above-described "outlier" (for example, identification information of a parent node of each of the partial clusters) and includes identification information of the sensor node 50 corresponding to the above-described "outlier", and outputs the generated command to the IF unit 11.

FIG. 17 is a diagram illustrating an example of the format of the command signal for transition to the relay dedicated node in the second embodiment. As illustrated in FIG. 17, for example, the server 10 transmits the "command signal for transition" that includes the partial cluster (50-1) as a "destination address" and includes the sensor node (50-4) as "identification information of a sensor node as a target of the command signal for transition to the relay dedicated node".

As described above, according to the second embodiment, the processor 12 in the server 10 further collects sensing values of the respective sensor nodes included in each of the partial clusters. Then, if an outlier is included in the sensing values collected for a certain cluster, the processor 12 calculates a calibration reference value of the certain cluster while excluding the sensing value corresponding to the outlier.

With this configuration of the server 10, it is possible to calculate the calibration reference value while excluding an outlier; therefore, it is possible to improve the accuracy of the calibration reference value.

Furthermore, the processor 12 in the server 10 causes a sensor node corresponding to the outlier to shift to a "relay dedicated mode".

With this configuration of the server 10, it is possible to exclude a sensing value corresponding to an outlier from targets of sensing values that are periodically reported from the sensor nodes; therefore, it is possible to improve the accuracy of the sensing values collected by the server 10. Furthermore, it is possible to cause a sensor node corresponding to the outlier to operate as a relay station; therefore, it is possible to stabilize multi-hop communication.

According to a disclosed embodiment, it is possible to reduce the load of a calibration process in a sensor network.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
a processor configured to:
control calibration of sensing values in a sensor node group formed of sensor nodes each including a sensor and a wireless device and being capable of performing multi-hop communication;
divide the sensor node group into a plurality of clusters such that each of the clusters includes at least one partial cluster including a relay node and a child node that performs wireless communication;
collect an average of sensing values in each of the partial clusters from the relay node of each of the partial clusters;
calculate a calibration reference value of each of the clusters from the collected averages of the respective partial clusters; and
provide the calculated calibration reference value of each of the clusters to each of the clusters, wherein
the partial cluster is a group formed of the relay node and the child node of the relay node, and
in the partial cluster, the number of the child node that is accepted is limited.

2. The control device according to claim 1, wherein when a first cluster includes a plurality of partial clusters, the processor is further configured to calculate a calibration reference value of the first cluster by obtaining a weighted average based on a plurality of averages corresponding to the respective partial clusters and the number of sensor nodes included in each of the partial clusters.

3. The control device according to claim 1, wherein the processor is further configured to:
collect sensing values of the respective sensor nodes included in each of the partial clusters; and
when an outlier is included in the sensing values collected for a first cluster, calculate a calibration reference value of the first cluster while excluding a sensing value corresponding to the outlier.

4. The control device according to claim 3, wherein the processor is further configured to cause a first sensor node corresponding to the outlier not to transmit a sensing value of the first sensor node but to shift to a mode to transfer the sensing value of the first sensor node.

5. A non-transitory computer-readable recording medium storing a control program that causes a computer to execute a process comprising:
controlling calibration of sensing values in a sensor node group formed of sensor nodes each including a sensor and a wireless device and being capable of performing multi-hop communication;
dividing the sensor node group into a plurality of clusters such that each of the clusters includes at least one partial cluster including a relay node and a child node that performs wireless communication;
collecting an average of sensing values in each of the partial clusters from the relay node of each of the partial clusters;
calculating a calibration reference value of each of the clusters from the collected averages of the respective partial clusters; and providing the calculated calibration reference value of each of the clusters to each of the clusters, wherein the partial cluster is a group formed of the relay node and the child node of the relay node, and in the partial cluster, the number of the child node that is accepted is limited.

6. A sensor node that includes a sensor and a wireless device and that is capable of performing multi-hop communication, the sensor node comprising:

a processor configured to:

upon receiving an instruction signal for switching to a parent node mode, receive a beacon transmitted from another sensor node located near the subject node, accept the node serving as a transmission source of the received beacon as a child node of the subject node, and transmit a first instruction signal for transmission of a sensing value to the child node;

upon receiving the sensing value from the child node in accordance with the first instruction signal for transmission, calculate an average of sensing values of a partial cluster including the subject node and the child node by obtaining an average of a sensing value of the subject node and the sensing value of the child node, transmit the calculated average of the sensing values to a control device through the multi-hop communication, and transmit the instruction signal for switching to the parent node mode to the child node; and upon receiving a second instruction signal for transmission of a sensing value, transmit the sensing value of the subject node to a node serving as a transmission source of the second instruction signal for transmission, wherein the partial cluster is a group formed of a relay node and the child node of the relay node, and in the partial cluster, the number of the child node that is accepted is limited.

7. The sensor node according to claim 6, wherein upon receiving a calibration reference value of a cluster including the subject node, the processor is further configured to correct the sensing value of the subject node by using the calibration reference value.

* * * * *